US008032376B1

(12) United States Patent
Jordan (10) Patent No.: US 8,032,376 B1
(45) Date of Patent: Oct. 4, 2011

(54) PERSONALIZED ELECTRONIC GREETING CARD AND ASSOCIATED METHOD

(76) Inventor: Patrick Jordan, Houston, TX (US)

( * ) Notice: Subject to any disclaimer, the term of this patent is extended or adjusted under 35 U.S.C. 154(b) by 841 days.

(21) Appl. No.: 12/082,877

(22) Filed: Apr. 15, 2008

Related U.S. Application Data (60) Provisional application No. 60/923,558, filed on Apr. 16, 2007.

(51) Int. Cl.
*G10L 13/00* (2006.01)
(52) U.S. Cl. ............. 704/258; 704/260; 40/124.03; 40/124.11
(58) Field of Classification Search .......... 704/258, 704/260; 40/124.03, 124.11
See application file for complete search history.

(56) References Cited

U.S. PATENT DOCUMENTS

| 5,063,698 | A | 11/1991 | Johnson |
| 5,652,606 | A | 7/1997 | Sasaki |
| 6,441,921 | B1 | 8/2002 | Soscia |
| 2003/0156686 | A1* | 8/2003 | Pines ............ 379/67.1 |
| 2005/0163291 | A1* | 7/2005 | Turner .......... 379/88.17 |
| 2007/0169387 | A1* | 7/2007 | Glass ........... 40/124.03 |
| 2007/0171278 | A1* | 7/2007 | Chen ............... 348/61 |

\* cited by examiner

*Primary Examiner* — Daniel D Abebe (57) ABSTRACT

An electronic greeting card for recording and playing back a personalized message includes a bifurcated card with first and second coextensively shaped sections pivotally coupled to each other. The device further includes a mechanism for recording and playing back a one-time personalized message associated with the greeting card, and a mechanism for adapting the recording and playback mechanism between inoperable and operable modes for allowing a sender to record the one-time personalized message on the recording and playback device and thereafter allowing a recipient to repeatedly play back the one-time personalized message.

18 Claims, 8 Drawing Sheets

PERSONALIZED ELECTRONIC GREETING CARD AND ASSOCIATED METHOD

CROSS REFERENCE TO RELATED APPLICATIONS

This application claims the benefit of U.S. Provisional Application No. 60/923,558, filed Apr. 16, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to greeting cards and, more particularly, to an electronic greeting card for recording and playing back a personalized message.

2. Prior Art

Techniques for incorporating sound messages into greeting cards are known in the prior art, and include a switch that may be depressed to activate playback of a sound message. While such techniques certainly enhance the personalization of a greeting card or postcard, they are accompanied by a number of drawbacks. First, despite ongoing progress in the miniaturization of electronic components, such playback devices are relatively large and bulky relative to the sheet material that forms the card, and hence interfere with the aesthetics of the card by providing either an unsightly bulge or unwanted thickness along at least a portion of the card. To minimize the aesthetic intrusiveness of such modules, they are manufactured in as compact and lightweight a form as possible. However, the resulting small and lightweight structures of such modules necessarily limit the quality of the sound they produce, and render them fragile and susceptible to breakage when conveyed through the various machinery of the postal service. Thirdly, the power cells used in such modules are likewise necessarily small and of limited power capacity, which in turn limits the module to a relatively short lifetime of operation.

U.S. Pat. No. 5,063,698 to Johnson discloses a personalized greeting card that includes an independent, detachable, electronic memory device that stores electronic signals, a mechanism for retrieving the electronic signals from the memory device, a voice synthesizer which obtains these electronic signals and produces audible sounds representative of the personalized message, and a switch that controls the retrieving device and the voice synthesizer. Prior to incorporating the memory device in the card, an EPROM translation machine converts the personalized message obtained from the sender of the card into appropriate electronic signals and stores those representative electronic signals in the memory device. The memory device is then detached from the EPROM and mounted in the circuitry disposed in the greeting card. Unfortunately, this prior art example creates a bulky appearance and interferes with the aesthetics of the card.

U.S. Pat. No. 5,652,606 to Sasaki discloses a message card that includes a button type dry battery, a visual image display, a speaker, a control circuit for recording, storing and reproducing both of visual images and audio messages data, a flexible circuit substrate for mounting the control circuit, connecting substrate formed integrally to the circuit substrate for connecting electrically the control circuit with the visual image display and with the speaker, writing terminals for writing desired visual images and audio messages data on the control circuit and being connected electrically to the control circuit on the substrate, and a switch for activating the reproduction of the visual images and the audio messages data. Unfortunately, this prior art example does not prevent the card recipient from erasing the original audio recorded message.

U.S. Pat. No. 6,441,921 to Soscia discloses a system and method for optically imprinting and reading sound data onto a piece of printed sheet material such as a greeting card. The system includes an encoding device for converting a sound message into a two-dimensional encodement, a printer for invisibly imprinting the encodement onto the greeting card, and a reader for optically reading the encodement and converting it into a sound corresponding to the message. The encoding device preferably converts the sound message into a compressed digitized form prior to its ultimate conversion into a two-dimensional encodement. The reader preferably includes a lens for focusing an image of the encodement onto the image sensor array. The sensor array responds to the image by generating a digital signal representative of the compressed sound that the reader decompresses and renders into an analog sound signal which is representative of the original sound image. Both the system and method are particularly useful in providing an individualized sound message on customized greeting cards. Unfortunately, this prior art example is not designed for enabling a user to express a thoughtful greeting with his/her own voice.

Accordingly, the present invention is disclosed in order to overcome the above noted shortcomings. The electronic greeting card is convenient and easy to use, lightweight yet durable in design, and designed for recording and playing back a personalized message. The device is simple to use, inexpensive, and designed for many years of repeated use.

BRIEF SUMMARY OF THE INVENTION

In view of the foregoing background, it is therefore an object of the present invention to provide a device for recording and playing back a personalized message. These and other objects, features, and advantages of the invention are provided by an electronic greeting card.

An electronic greeting card for recording and playing back a personalized message includes a bifurcated card with first and second coextensively shaped sections pivotally coupled to each other. The device further includes a mechanism for recording and playing back a one-time personalized message associated with the greeting card. Such a recording and playback mechanism includes a user interface displayed at the second section, a power source electrically connected to the user interface, a recording and playback device electrically coupled to the user interface and the power source respectively, and a read only memory electrically coupled to the recording and playback device for conveniently receiving and storing the one-time personalized message and thereby preventing modification thereof after an initial recording. The recording and playback mechanism further includes an amplifier and a transducer electrically coupled thereto for audibly transmitting the one-time personalized message. Such an amplifier is electrically mated to the recording and playback device.

The device further includes a mechanism for adapting the recording and playback mechanism between inoperable and operable modes for effectively allowing a sender to record the one-time personalized message on the recording and playback device and thereafter allowing a recipient to repeatedly play back the one-time personalized message. Such a recording and playback adapting mechanism includes first, second and third logic gates disposed at one of the first and second sections, a plurality of magnetic panels contiguously disposed along first, second and third edges of the second section respectively, and a plurality of sensors electrically coupled to corresponding ones of the first, second and third logic gates respectively. Such sensors are juxtaposed along first, second, and third edges of the first section and further are adjoined adjacent to the magnetic panels respectively. The sensors generate and transmit respective true and false signals to the corresponding logic gates when adjoined and separated from corresponding ones of the first, second and third magnetic panels as the first and second sections are pivotally adapted between open and closed positions respectively. A first plurality of the sensors is aligned along the first edge of the second section, and a second plurality of the sensors is aligned along the second edge of the second section. A third plurality of the sensors is aligned along the third edge of the second section.

The recording and playback adapting mechanism further includes: a toggle switch electrically coupled to each of the first, second and third logic gates, and each of the first, second and third logic gates generates and transmits a respective true output signal when all of the input signals are true for toggling the switch to an operable position and thereby adapting the recording and playback mechanism to the operable mode. Each of the first, second and third logic gates advantageously generates and transmits a respective false output signal when at least one of the input signals is false for toggling the switch to an inoperable position and thereby adapting the recording and playback mechanism to the inoperable mode.

The recording and playback mechanism is inactive when the first and second sections are effectively disposed at an initial closed position and the recording and playback mechanism is activated after the first and second sections are pivoted to an initial open position from the initial closed position. The recipient is prohibited from recording a new personalized message after the one-time personalized message has been recorded.

A method for recording and playing back a personalized message associated with a greeting card includes the steps of: providing a bifurcated card having first and second coextensively shaped sections pivotally coupled to each other; providing a device for recording and playing back a one-time personalized message associated with the greeting card; adapting the recording and playback device between inoperable and operable modes; when the device is adapted to an operable mode, a sender recording the one-time personalized message on the recording and playback device; and a recipient playing back the one-time personalized message while being prohibited from recording a new personalized message after the one-time personalized message has been recorded.

The method further includes the steps of: providing and disposing first, second and third logic gates at one of the first and second sections; providing and contiguously disposing a plurality of magnetic panels along first, second and third edges of the second section respectively; providing and electrically coupling a plurality of sensors to corresponding ones of the first, second and third logic gates respectively; juxtaposing the sensors along first, second, and third edges of the first section; pivotally adapting the first and second sections between open and closed positions respectively by adjoining the sensors adjacent to the magnetic panels respectively; and the sensors generating and transmitting respective true and false signals to the corresponding logic gates when adjoined and separated from corresponding ones of the first, second and third magnetic panels.

The method further includes the steps of: providing and electrically coupling a toggle switch to each of the first, second and third logic gates; each of the first, second and third logic gates generating and transmitting a respective true output signal when all of the input signals are true for toggling the switch to an operable position and thereby adapting the recording and playback device to the operable mode; and each of the first, second and third logic gates generating and transmitting a respective false output signal when at least one of the input signals is false for toggling the switch to an inoperable position and thereby adapting the recording and playback device to the inoperable mode.

The method further includes the steps of: deactivating the recording and playback device by disposing the first and second sections at an initial closed position; and activating the recording and playback device by pivoting the first and second sections to an initial open position from the initial closed position.

The method further includes the steps of: aligning a first plurality of the sensors along the first edge of the second section; aligning a second plurality of the sensors along the second edge of the second section; and aligning a third plurality of the sensors along the third edge of the second section.

The method further includes the steps of: providing and displaying a user interface at the second section; providing and electrically connecting a power source to the user interface; providing and electrically coupling a recording and playback device to the user interface and the power source respectively; providing and electrically coupling a read only memory to the recording and playback device for receiving and storing the one-time personalized message and thereby preventing modification thereof after an initial recording; providing an amplifier and a transducer; and electrically coupling the amplifier to the transducer and the recording and playback device respectively for audibly transmitting the one-time personalized message.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL
VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-6c by the reference numeral 10 and is intended to provide an electronic greeting card. It should be understood that the device may be used to incorporate a playback device into many different types of cards and should not be limited to use with only those types of greeting cards mentioned herein.

Referring initially to FIGS. 1, 2, 3, 4, 5, 6a, 6b and 6c a preferred embodiment of the present invention discloses an electronic greeting card 10 for recording and playing back a personalized message, which preferably includes a bifurcated card 20 with first and second coextensively shaped sections 21, 22 pivotally coupled to each other. The device 10 further includes a mechanism 23 for recording and playing back a one-time personalized message associated with the greeting card. Such a recording and playback mechanism 23 includes a user interface 24 displayed at the second section 22, a power source 25 electrically connected to the user interface 24, a recording and playback device 26 electrically coupled to the user interface 24 and the power source 25 respectively, and a read only memory 27 electrically coupled to the recording and playback device 26 for receiving and storing the one-time personalized message and thereby preventing modification thereof after an initial recording.

Figure 1:
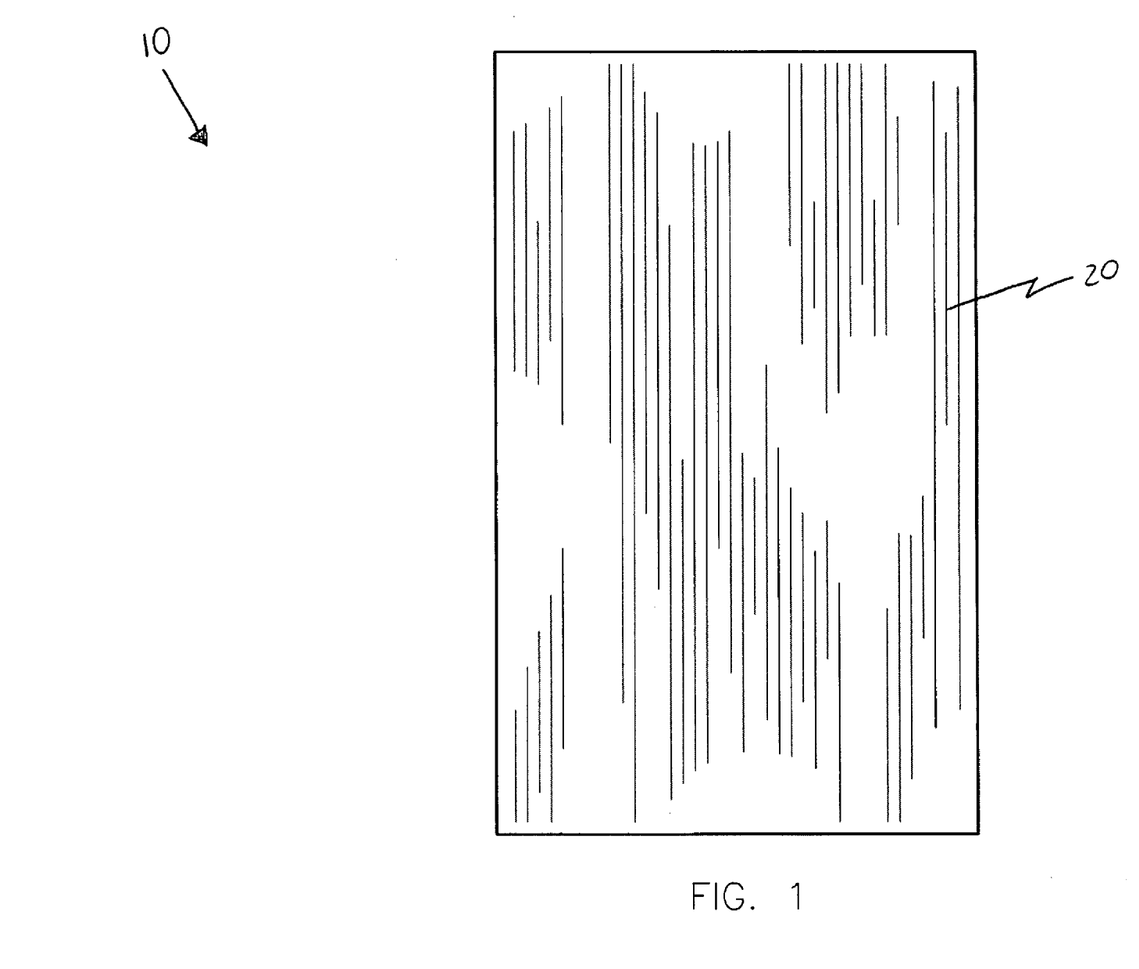
FIG. 1 is a front elevational view of an electronic greeting card, in accordance with the present invention.
Figure 2:
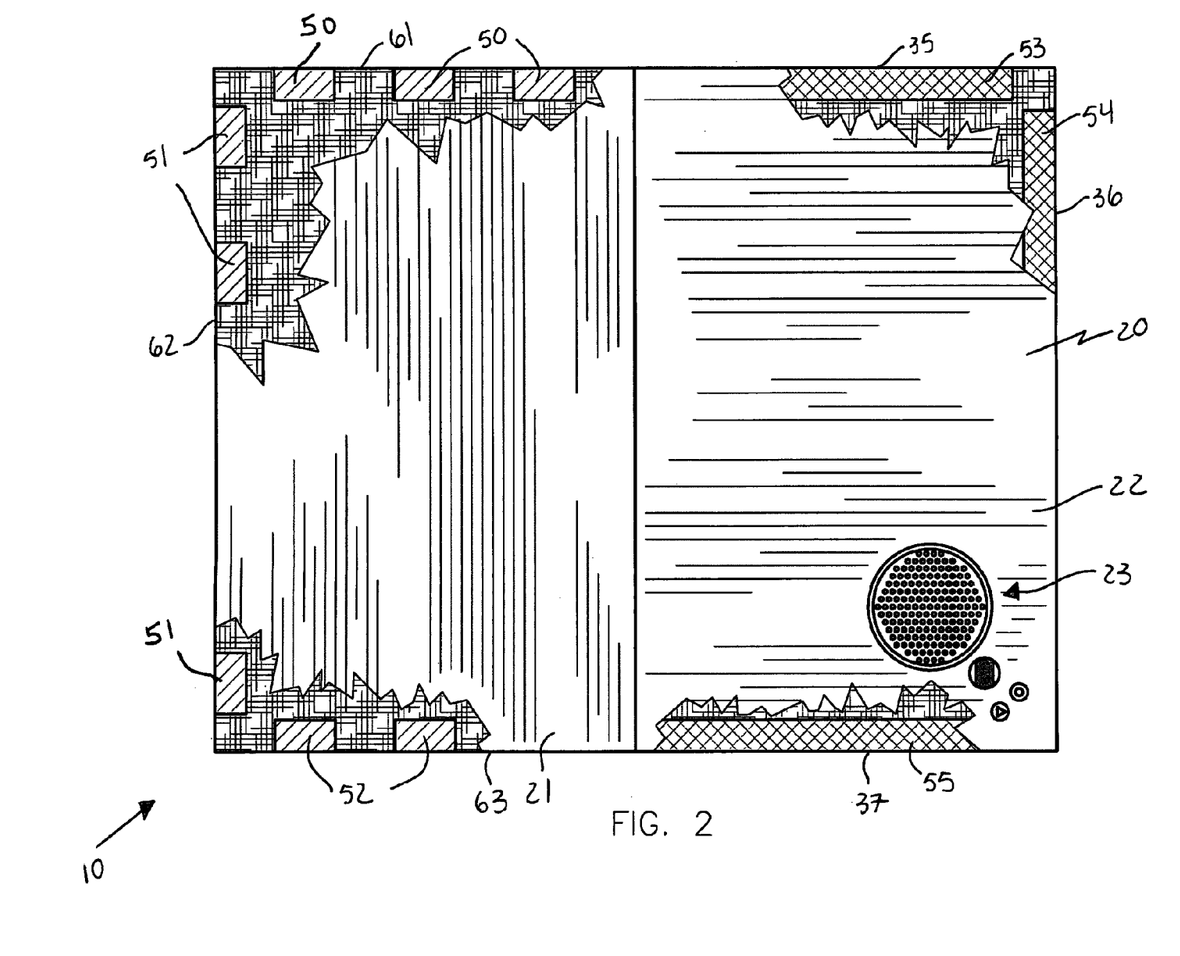
FIG. 2 is a front elevational view of an electronic greeting card adapted into an open position, with partially broken views showing sensors and magnetic panels displayed along the edges of the greeting card, in accordance with the present invention.
Figure 3:
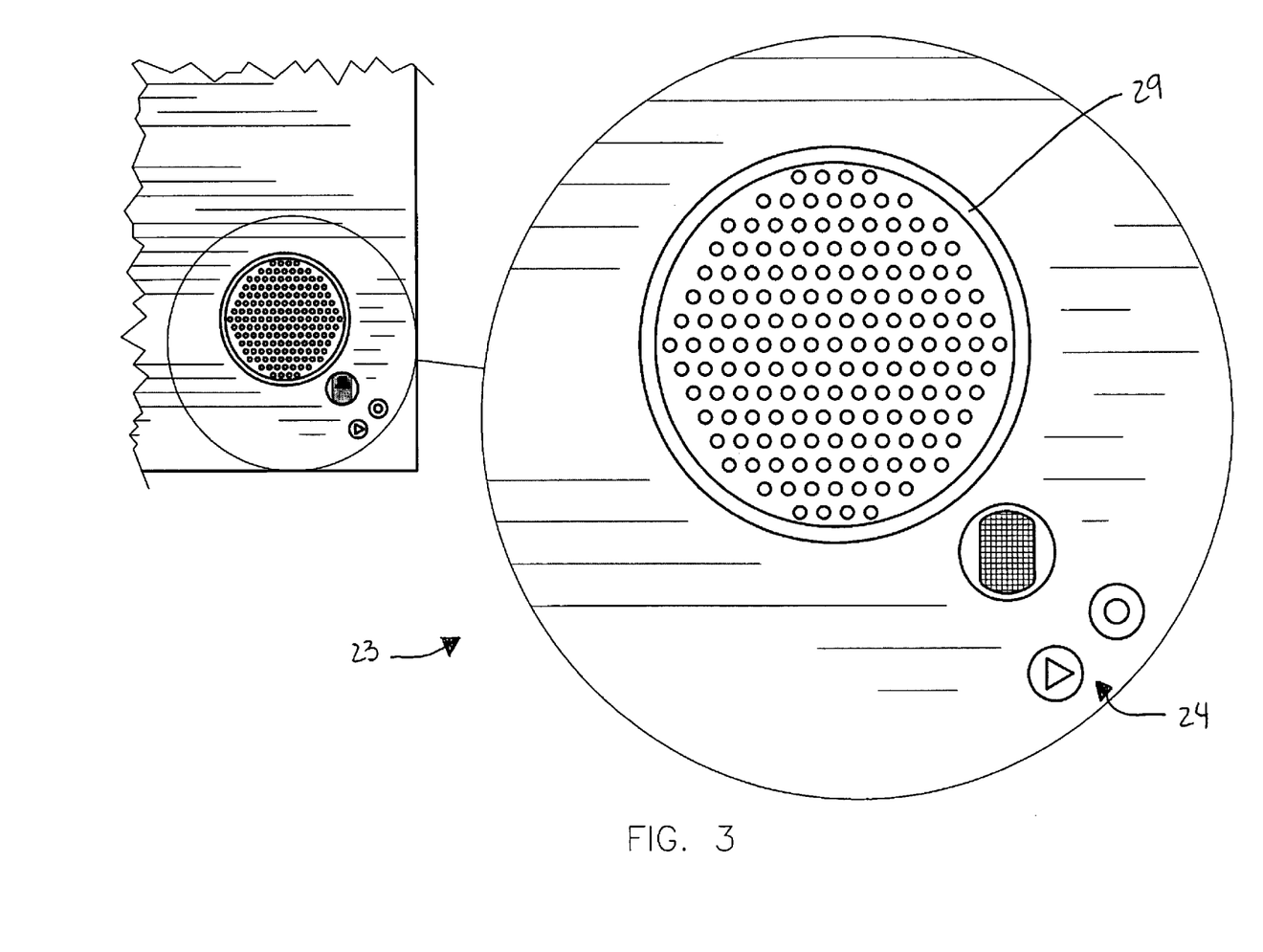
FIG. 3 is an enlarged view of the user interface and speaker, as seen in FIG. 2.
Figure 4:
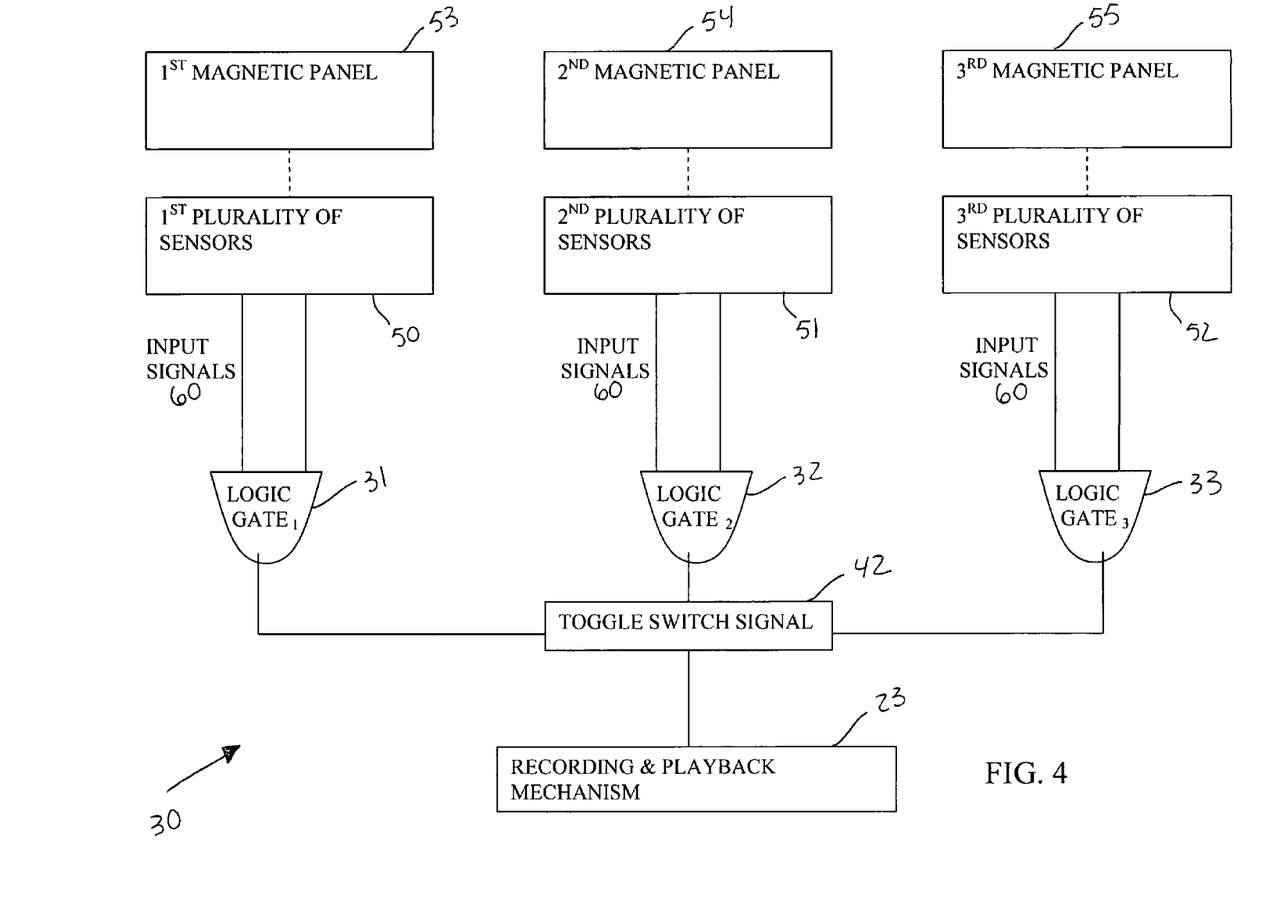
FIG. 4 is a schematic block diagram showing the interrelationship between the major electronic components of the recording and playback adapting mechanism, in accordance with the present invention.
Figure 5:
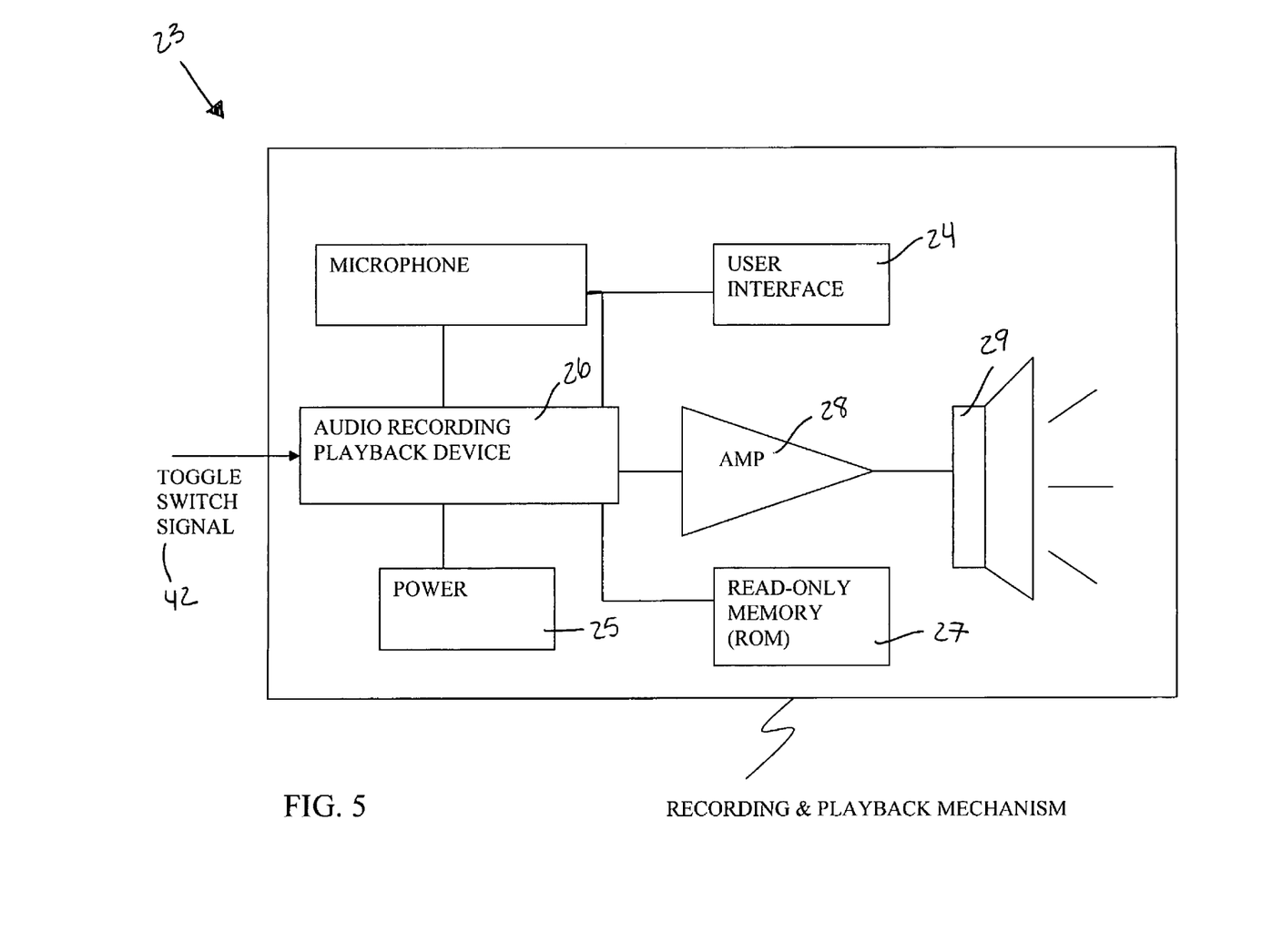
FIG. 5 is a schematic block diagram showing the interrelationship between the major electronic components of the recording and playback mechanism, in accordance with the present invention.
Figure 6A:
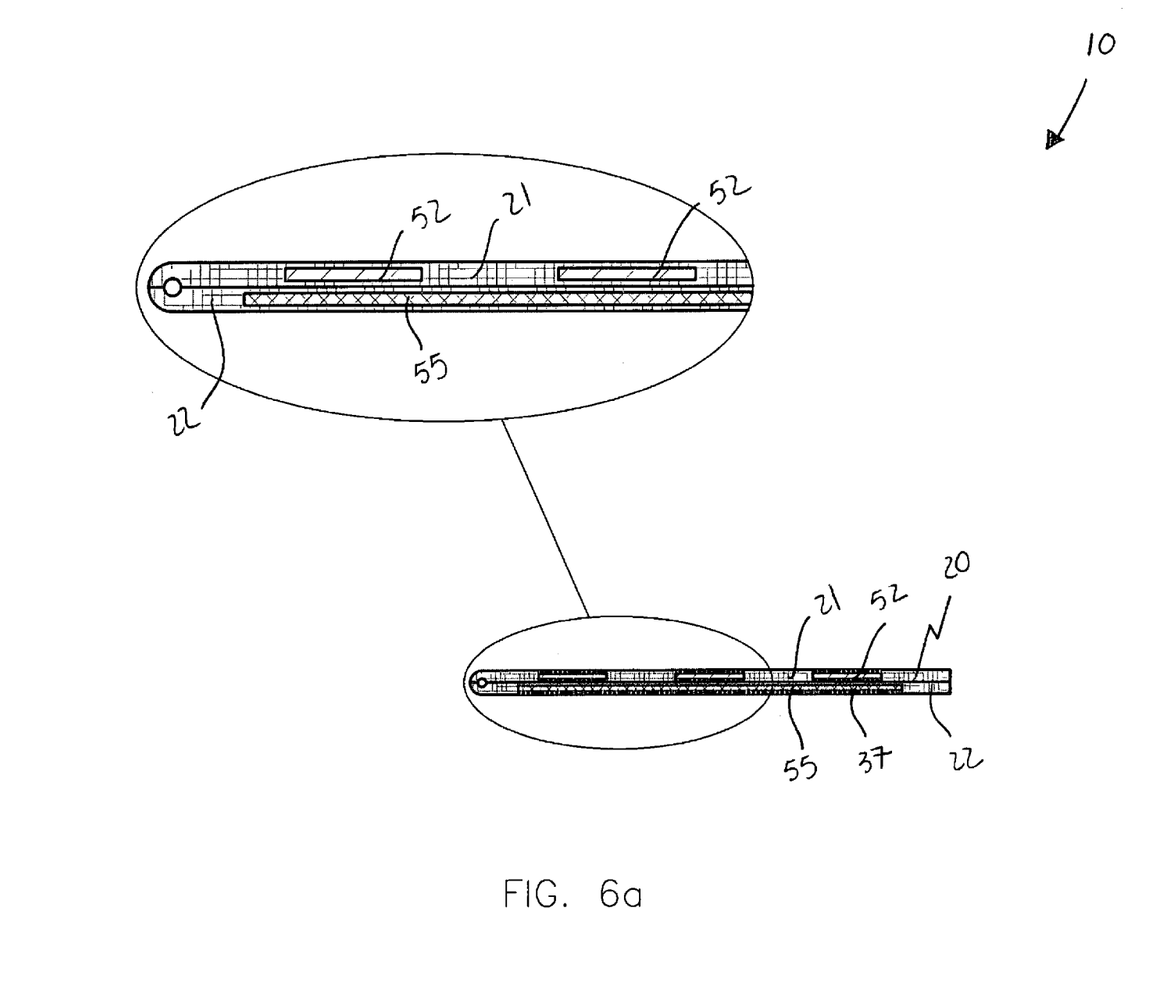
FIG. 6a is a cross sectional view of the electronic greeting card adapted to a closed position, with an enlarged view showing the sensors and magnetic panels in close proximity to each other, in accordance with the present invention.
Figure 6B:
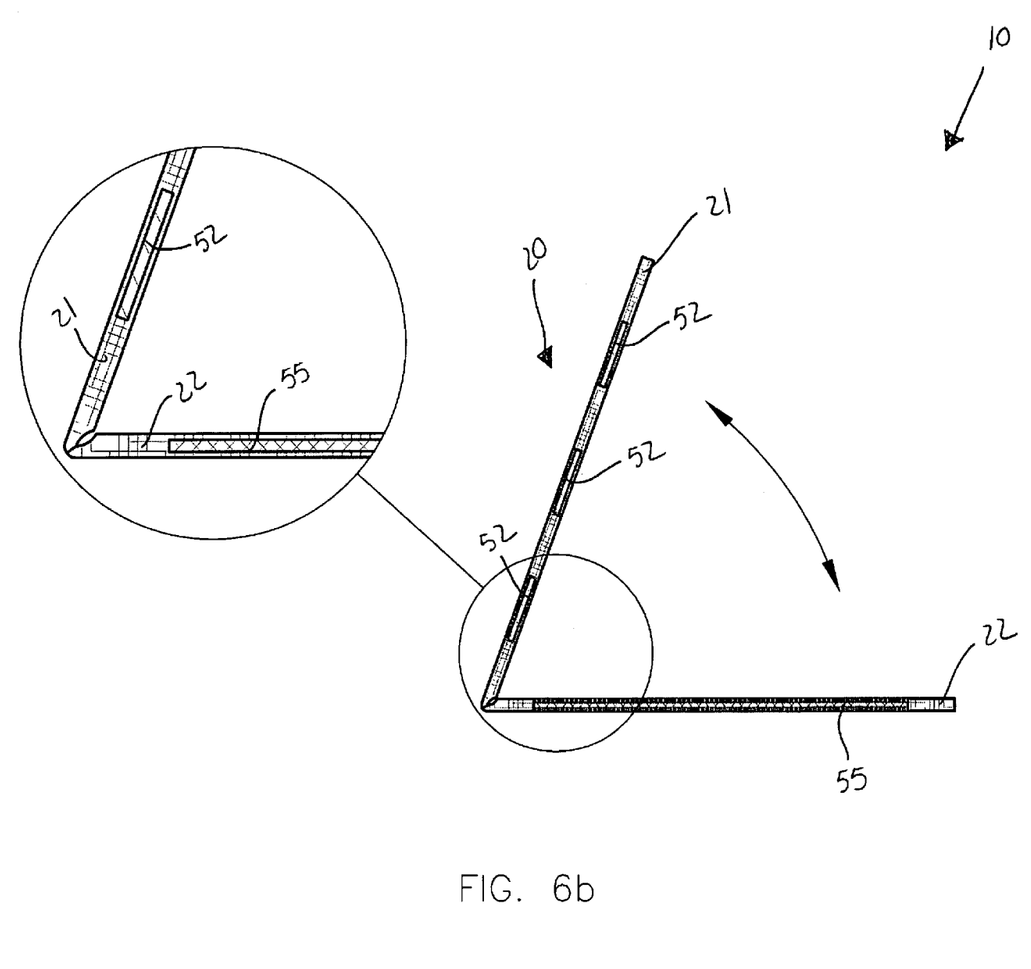
FIG. 6b is a cross sectional view of the electronic greeting card as seen in FIG. 6a, adapted to a partially open position, with an enlarged view showing the sensors and magnetic panels spaced apart from each other.
Figure 6C:
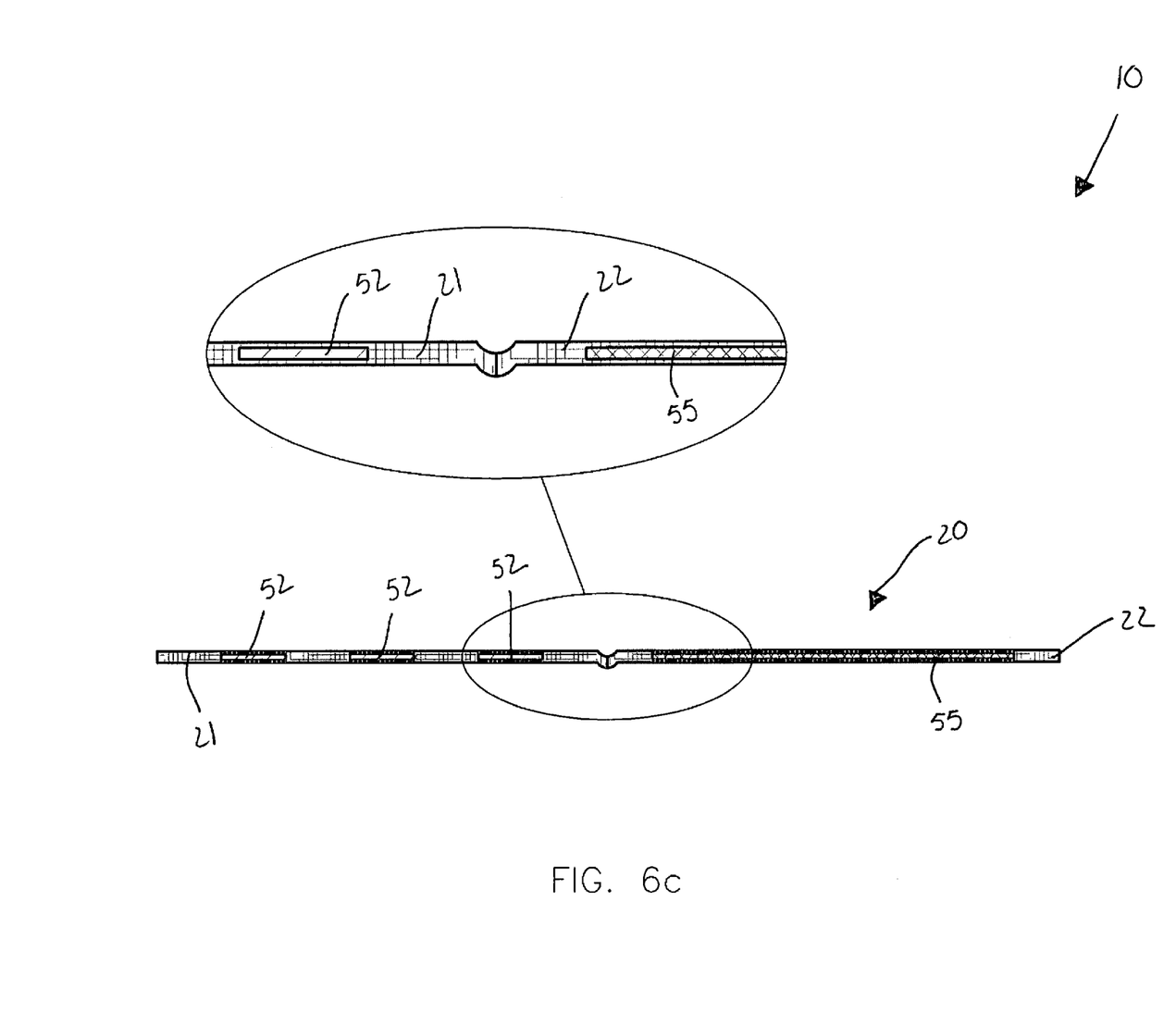
FIG. 6c is a cross sectional view of the electronic greeting card as seen in FIG. 6b, adapted into a fully open position, with an enlarged view showing the sensors and magnetic panels spaced at a maximum distance apart from each other.

The recording and playback mechanism 23 further includes an amplifier 28 and a transducer 29 electrically coupled thereto for audibly transmitting the one-time personalized message. Such an amplifier 28 is electrically mated to the recording and playback device 26. The recording and playback mechanism 23 enables a user to advantageously record a personalized message that will automatically be audible to a recipient when the greeting card is adapted to an open position.

Referring to FIGS. 4, 6a, 6b and 6c the device 10 further includes a mechanism 30 for adapting the recording and playback mechanism 23 between inoperable and operable modes for allowing a sender to record the one-time personalized message on the recording and playback device 26 and thereafter allowing a recipient to repeatedly play back the one-time personalized message. Such a recording and playback adapting mechanism 30 includes first, second and third logic gates 31, 32, 33 disposed at one of the first and second sections 21, 22, a plurality of magnetic panels 53, 54, 55 contiguously disposed along first, second and third edges 35, 36, 37 of the second section 22 respectively, and a plurality of sensors 50, 51, 52 electrically coupled to corresponding ones of the first, second and third logic gates 31, 32, 33 respectively.

Such sensors 50, 51, 52 are juxtaposed along first, second, and third edges 61, 62, 63 of the first section 21 and further are detachably adjoined adjacent to the magnetic panels 53, 54, 55 respectively. The sensors 50, 51, 52 generate and transmit respective true and false signals to the corresponding logic gates 31, 32, 33 when adjoined and separated from corresponding ones of the first, second and third magnetic panels 53, 54, 55 as the first and second sections 21, 22 are pivotally adapted between open and closed positions respectively. A first plurality of the sensors 50 is aligned along the first edge 35 of the second section 22, and a second plurality of the sensors 51 is aligned along the second edge 36 of the second section 22. A third plurality of the sensors 52 is aligned along the third edge 37 of the second section 22. As can be appreciated, once the sensors 50-52 are displaced a maximum distance away from the magnetic panels 53-55, the sensors 50-52 are triggered.

The recording and playback adapting mechanism 30 allows the recording and playback mechanism 23 to transmit the recorded message to a recipient when the greeting card is adapted to an open position and an appropriate control button is depressed at the user interface. When the greeting card is adapted to a closed position, the recording and playback mechanism will cease to transmit the recorded message. It is noted that the one-time personalized message can be recorded only after the greeting card is adapted to an initial open position, the record button is pressed at the user interface. Thus, once the greeting card is closed after the one-time personalized message is recorded, the one-time personalized message cannot be rerecorded so that the recipient receives a true message and not an altered message.

Referring again to FIG. 4, the recording and playback adapting mechanism 30 further includes: a toggle switch 42 electrically coupled to each of the first, second and third logic gates 31, 32, 33, and each of the first, second and third logic gates 31, 32, 33 generates and transmits a respective true output signal when all of the input signals 60 are true for toggling the switch 42 to an operable position and thereby adapting the recording and playback mechanism 23 to the operable mode. Each of the first, second and third logic gates 31, 32, 33 generates and transmits a respective false output signal when at least one of the input signals is false for toggling the switch 42 to an inoperable position and thereby adapting the recording and playback mechanism 23 to the inoperable mode.

The recording and playback mechanism 23 is inactive when the first and second sections 21, 22 are disposed at an initial closed position and the recording and playback mechanism 23 is activated after the first and second sections 21, 22 are pivoted to an initial open position from the initial closed position. The recipient is prohibited from recording a new personalized message after the one-time personalized message has been recorded. The combination of such claimed elements provides an unpredictable and unexpected result which is not rendered obvious by one skilled in the art.

The device advantageously provides a new type of audio greeting card which affords users the ability to record a personalized message, in their own voice, for delivery to the recipient. Generally rectangular in shape, the card is a specially designed greeting card that may be manufactured of heavy-duty card stock or similar paper material, as examples. As with traditional greeting cards, the card can be imprinted with a variety of sentiments and salutations for everyday and holiday use. Further, the card may boast a variety of decorative images which adorn the front of the card. Considerations can include everything from artistic renderings of landscapes, to bountiful floral motifs, to comical caricatures, to name a few. As can be imagined, design considerations for the cards line are virtually limitless.

A preferred embodiment of the card may feature a voice recorder and playback mechanism, integrated into the design of the card. Located in the lower, inside corner of the interior of the cards are the requisite electronic components used to record and playback messages. The individual component parts may include an audio recording and playback device, a mini-microphone, speaker and battery or other appropriate power source. A recording and playback adapting mechanism detects when the card is opened. The audio recording playback device records and stores a personalized message transmitted via the microphone, and the message is played back via the speaker each time the card is opened and a user recipient input is received. Small pushbutton switches may control the recording function. An envelope for sending the card may also be included with each version of the device.

The present invention, as claimed, provides the unexpected and unpredictable benefit of an apparatus that is convenient and easy to use, is lightweight yet durable in design, and assists a user to record and playback a personalized message. Such a device offers consumers a beautifully crafted greeting card to share with a loved one which conveys both a written and audible sentiment. Enabling the user to express a loving thought, humorous anecdote or greeting of good tidings, in their own voice and using their own words, the device provides a truly personalized message with which to express care for a loved one or a friend.

Featuring a variety of unique and creative illustrations and statements, the device is a successful and distinct addition to the greeting card industry. Expressing love and admiration, the device offers consumers a simple and clever means of showing another person they care. The present invention is simple to use, inexpensive, and comes in a variety of shapes, sizes, and patterns.

In use, a method for recording and playing back a personalized message associated with a greeting card includes the steps of: providing a bifurcated card 20 having first and second coextensively shaped sections 21, 22 pivotally coupled to each other; providing a device 26 for recording and playing back a one-time personalized message associated with the greeting card; adapting the recording and playback device 26 between inoperable and operable modes; when the device 26 is adapted to an operable mode, a sender recording the one-time personalized message on the recording and playback device 26; and a recipient playing back the one-time personalized message while being prohibited from recording a new personalized message after the one-time personalized message has been recorded.

In use, the method further includes the steps of: providing and disposing first, second and third logic gates 31, 32, 33 at one of the first and second sections 21, 22; providing and contiguously disposing a plurality of magnetic panels 53, 54, 55 along first, second and third edges 35, 36, 37 of the second section 22 respectively; providing and electrically coupling a plurality of sensors 50, 51, 52 to corresponding ones of the first, second and third logic gates 31, 32, 33 respectively; juxtaposing the sensors 50, 51, 52 along first, second, and third edges 61, 62, 63 of the first section 21; pivotally adapting the first and second sections 21, 22 between open and closed positions respectively by adjoining the sensors 50, 51, 52 adjacent to the magnetic panels 53, 54, 55 respectively; and the sensors 50, 51, 52 generating and transmitting respective true and false signals to the corresponding logic gates 31, 32, 33 when adjoined and separated from the corresponding ones of the first, second and third magnetic panels 53, 54, 55.

In use, the method further includes the steps of: providing and electrically coupling a toggle switch 42 to each of the first, second and third logic gates 31, 32, 33; each of the first, second and third logic gates 31, 32, 33 generating and transmitting a respective true output signal when all of the input signals are true for toggling the switch 42 to an operable position and thereby adapting the recording and playback device 26 to the operable mode; and each of the first, second and third logic gates 31, 32, 33 generating and transmitting a respective false output signal when at least one of the input signals 60 is false for toggling the switch 42 to an inoperable position and thereby adapting the recording and playback device 26 to the inoperable mode.

In use, the method further includes the steps of: deactivating the recording and playback device 26 by disposing the first and second sections 21, 22 at an initial closed position; and activating the recording and playback device 26 by pivoting the first and second sections 21, 22 to an initial open position from the initial closed position.

In use, the method further includes the steps of: aligning a first plurality of the sensors 50 along the first edge 35 of the second section 22; aligning a second plurality of the sensors 51 along the second edge 36 of the second section 22; and aligning a third plurality of the sensors 52 along the third edge 37 of the second section 22.

In use, the method further includes the steps of: providing and displaying a user interface 24 at the second section 22; providing and electrically connecting a power source 25 to the user interface 24; providing and electrically coupling a recording and playback device 26 to the user interface 24 and the power source 25 respectively; providing and electrically coupling a read only memory 27 to the recording and playback device 26 for receiving and storing the one-time personalized message and thereby preventing modification thereof after an initial recording; providing an amplifier 28 and a transducer 29; and electrically coupling the amplifier 28 to the transducer 29 and the recording and playback device 26 respectively for audibly transmitting the one-time personalized message.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An electronic greeting card for recording and playing back a personalized message, said electronic greeting card comprising:
a bifurcated card having first and second sections pivotally coupled to each other;
means for recording and playing back a one-time personalized message associated with said greeting card; and
means for adapting said recording and playback means between inoperable and operable modes for allowing a sender to record said one-time personalized message on said recording and playback device and thereafter allowing a recipient to repeatedly play back said one-time personalized message;
wherein the recipient is prohibited from recording a new personalized message after said one-time personalized message has been recorded.

2. The electronic greeting card of claim 1, wherein said recording and playback adapting means comprises:
first, second and third logic gates disposed at one of said first and second sections;
a plurality of magnetic panels contiguously disposed along first, second and third edges of said second section respectively;
a plurality of sensors electrically coupled to corresponding ones of said first, second and third logic gates respectively, said sensors being juxtaposed along first, second, and third edges of said first section and further being adjoined adjacent to said magnetic panels respectively; and
wherein said sensors generate and transmit respective true and false signals to said corresponding logic gates when adjoined and separated from corresponding ones of said first, second and third magnetic panels as said first and second sections are pivotally adapted between open and closed positions respectively.

3. The electronic greeting card of claim 2, wherein said recording and playback adapting means further comprises: a toggle switch electrically coupled to each of said first, second and third logic gates;
wherein each of said first, second and third logic gates generates and transmits a respective true output signal when all of said input signals are true for toggling said switch to an operable position and thereby adapting said recording and playback means to said operable mode;
wherein each of said first, second and third logic gates generates and transmits a respective false output signal when at least one of said input signals is false for toggling said switch to an inoperable position and thereby adapting said recording and playback means to said inoperable mode.

4. The electronic greeting card of claim 1, wherein said recording and playback means is inactive when said first and second sections are disposed at an initial closed position, wherein said recording and playback means is activated after said first and second sections are pivoted to an initial open position from said initial closed position.

5. The electronic greeting card of claim 2, wherein a first plurality of said sensors is aligned along said first edge of said second section;
wherein a second plurality of said sensors is aligned along said second edge of said second section;
wherein a third plurality of said sensors is aligned along said third edge of said second section.

6. The electronic greeting card of claim 1, wherein said recording and playback means comprises:
a user interface displayed at said second section;
a power source electrically connected to said user interface;
a recording and playback device electrically coupled to said user interface and said power source respectively;
a read only memory electrically coupled to said recording and playback device for receiving and storing said one-time personalized message and thereby preventing modification thereof after an initial recording;
an amplifier and a transducer electrically coupled thereto for audibly transmitting said one-time personalized message, said amplifier being electrically mated to said recording and playback device.

7. An electronic greeting card for recording and playing back a personalized message, said electronic greeting card comprising:
a bifurcated card having first and second coextensively shaped sections pivotally coupled to each other;
means for recording and playing back a one-time personalized message associated with said greeting card; and
means for adapting said recording and playback means between inoperable and operable modes for allowing a sender to record said one-time personalized message on said recording and playback device and thereafter allowing a recipient to repeatedly play back said one-time personalized message;
wherein the recipient is prohibited from recording a new personalized message after said one-time personalized message has been recorded.

8. The electronic greeting card of claim 7, wherein said recording and playback adapting means comprises:
first, second and third logic gates disposed at one of said first and second sections;
a plurality of magnetic panels contiguously disposed along first, second and third edges of said second section respectively;
a plurality of sensors electrically coupled to corresponding ones of said first, second and third logic gates respectively, said sensors being juxtaposed along first, second, and third edges of said first section and further being adjoined adjacent to said magnetic panels respectively; and
wherein said sensors generate and transmit respective true and false signals to said corresponding logic gates when adjoined and separated from corresponding ones of said first, second and third magnetic panels as said first and second sections are pivotally adapted between open and closed positions respectively.

9. The electronic greeting card of claim 8, wherein said recording and playback adapting means further comprises: a toggle switch electrically coupled to each of said first, second and third logic gates;
wherein each of said first, second and third logic gates generates and transmits a respective true output signal when all of said input signals are true for toggling said switch to an operable position and thereby adapting said recording and playback means to said operable mode;
wherein each of said first, second and third logic gates generates and transmits a respective false output signal when at least one of said input signals is false for toggling said switch to an inoperable position and thereby adapting said recording and playback means to said inoperable mode.

10. The electronic greeting card of claim 9, wherein said recording and playback means is inactive when said first and second sections are disposed at an initial closed position, wherein said recording and playback means is activated after said first and second sections are pivoted to an initial open position from said initial closed position.

11. The electronic greeting card of claim 10, wherein a first plurality of said sensors is aligned along said first edge of said second section;
wherein a second plurality of said sensors is aligned along said second edge of said second section;
wherein a third plurality of said sensors is aligned along said third edge of said second section.

12. The electronic greeting card of claim 7, wherein said recording and playback means comprises:
a user interface displayed at said second section;
a power source electrically connected to said user interface;
a recording and playback device electrically coupled to said user interface and said power source respectively;
a read only memory electrically coupled to said recording and playback device for receiving and storing said one-time personalized message and thereby preventing modification thereof after an initial recording;
an amplifier and a transducer electrically coupled thereto for audibly transmitting said one-time personalized message, said amplifier being electrically mated to said recording and playback device.

13. A method for recording and playing back a personalized message associated with a greeting card, said method comprising the steps of:
a. providing a bifurcated card having first and second coextensively shaped sections pivotally coupled to each other;
b. providing a device for recording and playing back a one-time personalized message associated with said greeting card;
c. adapting said recording and playback device between inoperable and operable modes;
d. when said device is adapted to an operable mode, a sender recording said one-time personalized message on said recording and playback device; and
e. a recipient playing back said one-time personalized message while being prohibited from recording a new personalized message after said one-time personalized message has been recorded.

14. The electronic greeting card of claim 13, wherein step c. comprises the steps of:
providing and disposing first, second and third logic gates at one of said first and second sections;
providing and contiguously disposing a plurality of magnetic panels along first, second and third edges of said second section respectively;
providing and electrically coupling a plurality of sensors to corresponding ones of said first, second and third logic gates respectively;
juxtaposing said sensors along first, second, and third edges of said first section;
pivotally adapting said first and second sections between open and closed positions respectively by adjoining said sensors adjacent to said magnetic panels respectively; and
said sensors generating and transmitting respective true and false signals to said corresponding logic gates when adjoined and separated from corresponding ones of said first, second and third magnetic panels.

15. The method of claim 14, wherein step c. further comprises the steps of:
providing and electrically coupling a toggle switch to each of said first, second and third logic gates;
each of said first, second and third logic gates generating and transmitting a respective true output signal when all of said input signals are true for toggling said switch to an operable position and thereby adapting said recording and playback device to said operable mode; and
each of said first, second and third logic gates generating and transmitting a respective false output signal when at least one of said input signals is false for toggling said switch to an inoperable position and thereby adapting said recording and playback device to said inoperable mode.

16. The method of claim 13, wherein step c. comprises the steps of:
deactivating said recording and playback device by disposing said first and second sections at an initial closed position; and
activating said recording and playback device by pivoting said first and second sections to an initial open position from said initial closed position.

17. The method of claim 15, further comprising the steps of:
aligning a first plurality of said sensors along said first edge of said second section;
aligning a second plurality of said sensors along said second edge of said second section; and
aligning a third plurality of said sensors along said third edge of said second section.

18. The method of claim 13, wherein step b. comprises the steps of:
providing and displaying a user interface at said second section;
providing and electrically connecting a power source to said user interface;
providing and electrically coupling a recording and playback device to said user interface and said power source respectively;
providing and electrically coupling a read only memory to said recording and playback device for receiving and storing said one-time personalized message and thereby preventing modification thereof after an initial recording;
providing an amplifier and a transducer; and
electrically coupling said amplifier to said transducer and said recording and playback device respectively for audibly transmitting said one-time personalized message.

* * * * *